W. R. JEAVONS.
TOASTING DEVICE.
APPLICATION FILED FEB. 15, 1912.
1,045,296.
Patented Nov. 26, 1912.
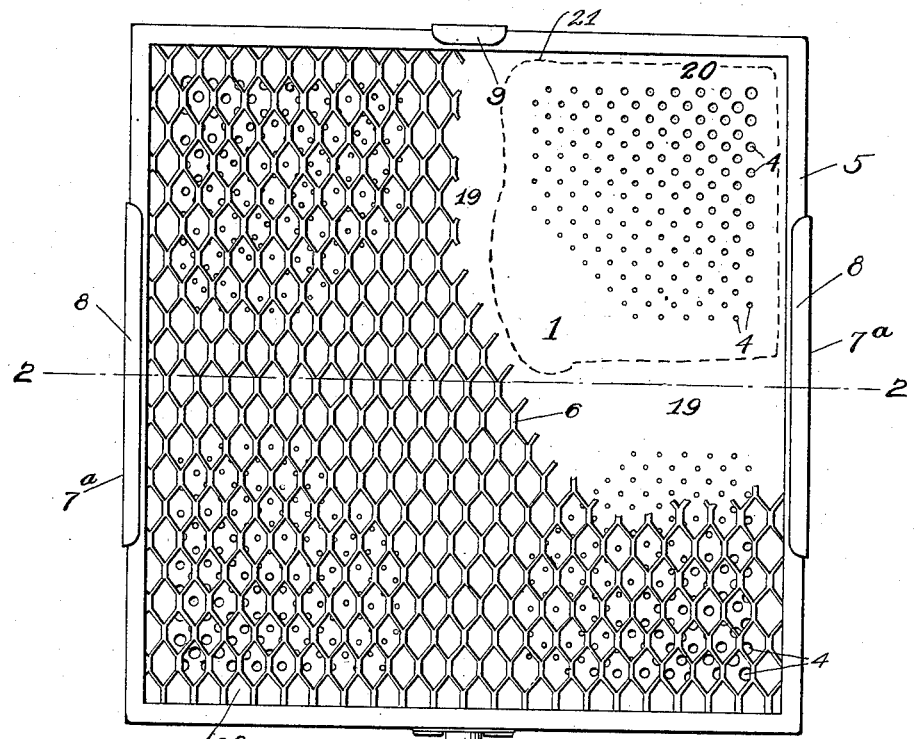
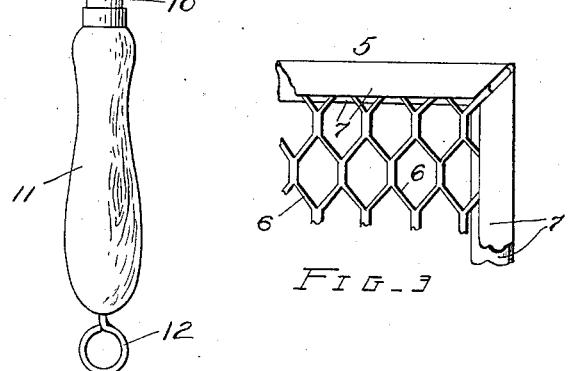
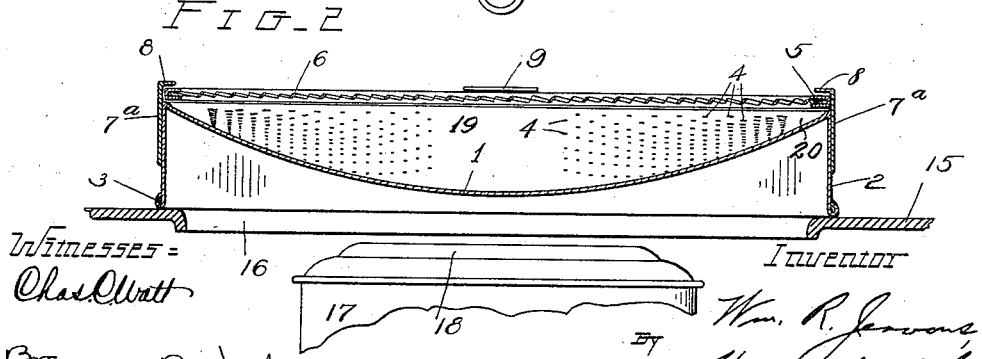

UNITED STATES PATENT OFFICE.

WILLIAM R. JEAVONS, OF CLEVELAND, OHIO.

TOASTING DEVICE.

1,045,296.  Specification of Letters Patent.  Patented Nov. 26, 1912.

Application filed February 15, 1912. Serial No. 677,797.

*To all whom it may concern:*

Be it known that I, WILLIAM R. JEAVONS, a citizen of the United States, residing at Cleveland, in the county of Cuyahoga and State of Ohio, have invented a certain new and useful Improvement in Toasting Devices, of which the following is a full, clear, and exact description, reference being had to the accompanying drawings.

This invention relates to devices for supporting articles such as slices of bread adjacent to a heat source, whereby the same may be cooked or toasted, and has for its object the provision of a simple, compact, cheaply made, and easily cleaned device which shall permit a plurality of slices of bread to be rapidly, efficiently and uniformly toasted at the same time and without any unpleasant drying or hardening of the crust portion thereof.

More specifically the object of the invention is the provision of a toasting device adapted to be employed in connection with a stove having a localized up-draft of highly heated air and products of combustion, such, for instance as the stove illustrated in my Patent No. 848,828 issued April 2, 1907, the object being so to spread the heated column and so to balance the effects of radiation and convection that the bread will be uniformly acted upon over all parts of the toasting surface.

Other objects and advantages of the invention reside in the particular features of construction which will be hereinafter described.

Generally speaking my invention may be defined as consisting of the combinations and arrangements of parts and elements recited in the claims hereto annexed and illustrated in the drawings accompanying and forming a part hereof, wherein:

Figure 1 represents a plan view of a toaster constructed in accordance with my invention, a portion of the grid being broken away so as to illustrate the heating or spreading plate; Fig. 2 is a cross sectional view taken substantially upon the broken line 2—2 in Fig. 1, illustrating a portion of the stove top and burner chimney; and Fig. 3 is a bottom plan view of a corner of the grid showing the method of building up the same.

Describing the parts by reference characters, my improved toaster consists essentially of a rectangular sheet metal base member consisting of a downwardly convex plate portion 1 having at its edge a downwardly turned flange portion 2. This member is preferably formed by drawing the metal in dies to substantially the shape illustrated in Fig. 2, the plate 1 taking a uniform curvature over all its surface and the marginal edges of this plate lying in a single plane for the reception of the grid hereinafter described. The lower edge of the flange 2 is preferably rolled and wired, as at 3, so as to stiffen the device and prevent its becoming warped or deformed. This construction is also advantageous in preventing its becoming warped during the operation of enameling, in case enameling be desired. The central part of this plate is preferably left imperforate, as illustrated in Figs. 1 and 2, but the portions thereof removed from the center are provided with regularly arranged perforations 4, the diameter of said perforations being comparatively small nearest the center of the plate and increasing gradually with the distance from the center, whereby it will be seen that the perforations nearest the corners at a greater elevation than the other perforations and of considerably greater size.

The grid which I prefer to employ is made of expanded metal which, as is well known, is formed by slitting and expanding a piece of flexible sheet metal so as to produce a foraminous body having interstices defined by narrow strips of metal which radiate from intersections alternating with the interstices, forming a kind of net work. For finishing and stiffening this grid I employ a rectangular sheet metal frame 5 whose external dimensions are the same as those of the base member and whose internal dimensions are sufficiently smaller than the external to afford a suitable seat for the expanded metal support, which is herein illustrated by the reference character 6. The sides of the frame are formed with flexible lips 7 which are bent over upon the outside of the expanded metal as shown in Fig. 3, thus securing the whole firmly together. This grid is removably secured to the base member by means of clips 7ª secured to the sides of the flanges 2 in any convenient manner, as by riveting or welding, and having bent portions 8 overhanging the edge of the grid frame so as to form a slide in which the grid may be inserted. The forward end of the toaster body is provided with a clip similar to the clips 7ᵃ and having an overhanging lip 9, the clip forming a stop adapted to engage the forward edge of the grid and hold it in register with the base member, while the rear portion of the base member is provided with a boss 10 to which is secured a handle 11 by means of which the toaster may be manipulated. The end of the handle may be provided with an eye 12 for suspending the device when not in use.

In Fig. 2 I have illustrated a portion of the top of a stove of the type to which this toaster is particularly applicable, such stove comprising a flat top plate 15 having a circular aperture 16 therein and having an upright chimney or draft tube 17 supported centrally beneath the aperture, the upper end of said chimney or draft tube being provided with an inwardly inclined restricting flange 18. Gas, oil, or other combustible fluid being burned below or in the lower part of this chimney or draft tube, the heated gases escape upwardly therethrough in a comparatively small and well defined column as is well understood by those skilled in the art, and my improved toaster is located with the lowermost portion of the plate 1 immediately in line with the axis of this column. The gases are therefore caused to spread over the lower surface of this plate, the imperforate condition of the center of the plate causing these gases to pass entirely toward the side of the toaster and the graduated sizes of the perforations causing the heated gases to be distributed evenly through each perforated area beneath the bread supported thereabove. The center of the plate, being directly in the path of the heated column and nearest to the heat source, becomes more highly heated than any other part of the plate, but being farther removed from the surface of the grid by reason of the curvature of the plate than any other part thereof, its effect upon the bread thereon is not unduly great. Owing to the imperforate character of this portion it will be obvious that the total heating effect upon the bread thereabove will be due to radiation. At points farther removed from the center, the temperature of the plate will be markedly less, but its heating effect upon the bread will be balanced by its greater proximity thereto. Furthermore at this point certain of the products of combustion are allowed to pass through the smaller perforations and act by convection directly upon the bread, the sum of the effects of radiation and convection at this point being exactly the same as is the effect of radiation alone at the center of the plate. It will therefore be seen that the dished shape of the plate 1 has a twofold purpose; first in that the graduated distances of the upper surface thereof from the surface of the grid tends to render uniform its radiation effect upon the surface of the grid; and second in that it directs and induces the currents of heated air upwardly around the sides thereof and causes them to be distributed substantially equally on all sides of the heated column notwithstanding drafts in the locality of the toaster. It will furthermore be appreciated that the inclination of the plate and the size of the apertures are interdependent, since the greater the inclination of the plate, the greater the rush of heated air to the marginal portion thereof irrespective of gradations in the sizes of the perforations. The shape of the plate 1 and the size and disposition of the perforations thereon coöperate in causing a substantially uniform distribution of heat beneath the grid.

The present toaster has been designed of a size to receive four ordinary slices of bread within the area defined by the grid frame, and for the purpose of preventing the crust portions of the slices from becoming burned, over-dried, or unduly hardened, I have omitted the perforations along certain portions, as clearly shown at 19, and 20 in Fig. 1. The imperforate portions or strips 19 of the plate 1 extend radially from the center of the plate, and these imperforate portions or strips are substantially at right angles to each other and are of sufficient width to protect the adjacent crust portions of two slices of bread from the heat due to convection. Each group of perforations 4 is surrounded by an imperforate margin, said margin being formed by the adjacent portions of the imperforate strips 19 and the imperforate marginal portion 20 of the plate 1. With this construction, it will be apparent that the entire crust portion of a slice of bread will be supported above the imperforate portion of the plate 1 while only that part of the slice which is within the crust is subjected to the heat of convection through the openings 4. This is clearly indicated in Fig. 1, wherein the dotted lines 21 indicate the crust portion of a slice of bread. By reference to Fig. 2, it will be seen that the flange 2 extends downwardly a distance greater than the center of the plate 1. This results in forming a pocket for catching the heated gases from the burner and insuring their distribution through the perforations 4.

Having thus described my invention, what I claim is:

1. A device of the character set forth comprising, in combination, a perforated metal body having an imperforate central portion and an imperforate marginal portion with imperforate radial bands or strips extending from the central portion to the marginal portion, a flange depending from the peripheral portion of the body outside of the imperforate marginal portion thereof and forming a pocket with the under side of said body, and a grid supported above the perforations in said body.

2. A device of the character described comprising, in combination, a metal body having a plurality of perforated areas, each perforated area being comprised between a pair of imperforate radially extending bands or strips and an imperforate marginal portion of the body, a flange depending from the portion of the body outside of the imperforate marginal portion thereof and forming a pocket with the lower surface of the body, the area of perforation in each perforated portion of the body increasing from the inner or central portion toward the outer or peripheral portion of the body, and a grid supported above the perforations in said body.

3. A device of the character described comprising, in combination, a metal body having a depressed imperforate central portion and a plurality of perforated areas, each perforated area being comprised between the imperforate center, a pair of imperforate radially extending bands or strips, and an imperforate marginal portion of the body, a flange depending from the portion of the body outside of the imperforate marginal portion thereof and forming a pocket with the lower surface of the body, the area of perforation in each perforated portion of the plate increasing from the inner or central portion toward the outer or peripheral portion of the body, and a grid supported above the perforations in said body.

4. A device of the character set forth comprising a metal body having a perforated area of such extent as to be overlapped by the edges of a slice of bread and having an imperforate area surrounding the perforated area, and above which the edges or crust portion of a slice of bread may be supported, and means for supporting a slice of bread above the perforated area of the body with the edges or crust portion above the imperforate area of said body.

5. A device of the character set forth comprising a metal body having a perforated area of such extent as to be overlapped by the edges or crust portion of a slice of bread and having an imperforate area entirely surrounding the perforated area and above which the edges or crust portion of a slice of bread may be supported, and means for supporting a slice of bread above the perforated area of the body with the edges or crust portion above the imperforate area of said body, said body having a depending flange arranged to receive therewithin the heated gases and distribute the same through the perforations.

6. A device of the character set forth comprising a metal body having a depressed imperforate central portion and an elevated imperforate marginal portion with imperforate strips or bands extending radially from the center to the imperforate marginal portion of the body and said body being perforated within the areas bounded by the aforesaid imperforate portions, the area of perforation in each perforated zone increasing from the center toward the periphery of the body, a flange depending from the peripheral portion of the body at the outer side of the imperforate marginal portion thereof and extending downwardly a greater distance than the depressed center of the body, and means for supporting a grid above said body.

7. A toaster for stoves of the type wherein is produced an upwardly moving column of heated gases comprising a radiating and deflecting plate and a supporting grid adjacent to said plate, said plate being formed with perforations for the passage of said heated gases whereby the bread on said grid may be toasted by convection and certain portions of said plate being imperforate and spaced apart a distance substantially equal to the width of a slice of bread, whereby the bread crust is shielded from the action of the heated gases.

In testimony whereof, I hereunto affix my signature in the presence of two witnesses.

WILLIAM R. JEAVONS.

Witnesses:
J. B. HULL,
BRENNAN B. WEST.

---

Copies of this patent may be obtained for five cents each, by addressing the "Commissioner of Patents, Washington, D. C."